United States Patent
O'Brien et al.

(10) Patent No.: US 12,493,902 B2
(45) Date of Patent: Dec. 9, 2025

(54) PROVIDING PRODUCT LISTINGS ON AN AIRCRAFT FOR PRODUCTS AVAILABLE AT A DESTINATION

(71) Applicant: ViaSat, Inc., Carlsbad, CA (US)

(72) Inventors: Ultan O'Brien, Carrickmines (IE);
Niall O'Sullivan, Dundrum (IE);
Fergal Murray, Tomhaggard (IE)

(73) Assignee: ViaSat, Inc., Carlsbad, CA (US)

( * ) Notice: Subject to any disclaimer, the term of this patent is extended or adjusted under 35 U.S.C. 154(b) by 114 days.

(21) Appl. No.: 18/684,674

(22) PCT Filed: Aug. 19, 2022

(86) PCT No.: PCT/US2022/040969
§ 371 (c)(1),
(2) Date: Feb. 17, 2024

(87) PCT Pub. No.: WO2023/023382
PCT Pub. Date: Feb. 23, 2023

(65) Prior Publication Data
US 2024/0354821 A1 Oct. 24, 2024

Related U.S. Application Data

(60) Provisional application No. 63/235,673, filed on Aug. 20, 2021.

(51) Int. Cl.
*G06Q 30/0601* (2023.01)
*B64D 11/00* (2006.01)

(52) U.S. Cl.
CPC ..... *G06Q 30/0603* (2013.01); *B64D 11/0015* (2013.01); *G06Q 30/0631* (2013.01); *G06Q 30/0641* (2013.01)

(58) Field of Classification Search
CPC ..... G06Q 10/02; G06Q 30/0601–0643; G06Q 50/10; G06Q 50/40; H04W 4/40;
(Continued)

(56) References Cited

U.S. PATENT DOCUMENTS

2011/0313826 A1\* 12/2011 Keen ................. G06Q 30/0207
235/375
2017/0228837 A1\* 8/2017 Porter .................... G06Q 50/14
(Continued)

FOREIGN PATENT DOCUMENTS

WO WO 2009/097042 8/2009

OTHER PUBLICATIONS https://airfree.aero/. Recovered from www.archive.org at: https://web.archive.org/web/20191218060404mp)http://airfree.aero/team Dated: Dec. 18, 2019 (Year: 2019).\*
(Continued)

*Primary Examiner* — William J Allen
(74) *Attorney, Agent, or Firm* — Thorpe North & Western, LLP.

(57) ABSTRACT

Technology is described for providing electronic product listings for products available at a destination. In one example of the technology, destination information may be obtained from an aircraft data bus, where the destination information may be from a plurality of aircraft information systems located on the aircraft. The destination information may be sent to one or more vendor application programming interfaces (APIs) to obtain product details for at least one product that is available for purchase through an inflight entertainment system and available to be delivered to a customer at a flight destination. Product details received from a vendor API may be sent to a client device to be displayed in a graphical user interface of an inflight entertainment system, allowing a passenger on the aircraft to
(Continued)

view the product details with a plurality of product details for a plurality of products and purchase the product through the inflight entertainment system.

39 Claims, 11 Drawing Sheets

(58) Field of Classification Search
CPC ....... H04W 4/44; H04L 67/12; H04N 21/214; H04N 21/2146; B64D 11/0015–00155
See application file for complete search history.

(56) References Cited

U.S. PATENT DOCUMENTS

2017/0337531 A1* 11/2017 Kohli ................... G06Q 20/28
2020/0342040 A1* 10/2020 Adams ................. G06Q 20/12
2021/0124466 A1*  4/2021 Hoang ................. G06F 3/0482

OTHER PUBLICATIONS https://www.dutyfreepartners.com/in-flight. Recovered form www.archive.org at: https://web.archive.org/web/20191211063609/https://www.dutyfreepartners.com/in-flight 1/ Dated: Dec. 11, 2019. (Year: 2019).*
International Search Report and Written Opinion for International Application Serial No. PCT/US22/40969, dated Nov. 8, 2022, 10 pages, Rijswijk, NL.

* cited by examiner

PROVIDING PRODUCT LISTINGS ON AN AIRCRAFT FOR PRODUCTS AVAILABLE AT A DESTINATION

BACKGROUND

An inflight entertainment system (IFE) and related information systems may provide entertainment, moving map information, flight information, or other information to aircraft passengers during a flight. IFE systems may include centralized display monitors, seatback display monitors, connections for personal electronic devices via a wireless network, and so forth that enable aircraft passengers to consume media content, moving map information, electronic games, etc. The media content can include music, video content, news, comedy, moving map information, flight information, travel information, etc. Such video content can include television programs, movies, live television programs (e.g., live news programs, live sporting events), cable programs, etc. The moving map information may provide real-time flight information. For example, the moving map information may provide a map that illustrates a current position and direction of the aircraft, as well as other information about the flight (e.g., altitude, airspeed, outside air temperature, distance to destination, distance from origination point, local time, etc.)

In one example, IFE systems can provide in-flight network connectivity to personal electronic devices, such as mobile phones, laptops or tablet computers. For example, IFE systems may allow passengers to consume audio content, video content, games, maps, etc. using personal electronic devices. The personal electronic devices can receive the audio content, video content, games, maps, shopping, etc. from a server onboard the aircraft via a wireless access point (e.g., a Wi-Fi access point) in the aircraft. Further, IFE systems may provide in-cabin internet service, allowing aircraft passengers to perform activities, such as internet browsing, media viewing, shopping, texting, messaging, emailing, etc. using their personal electronic devices. A satellite network in communication with communications hardware on the aircraft can provide in-flight Internet service enables aircraft passengers to connect to the Internet from personal electronic devices via the wireless access point.

SUMMARY

A system can provide electronic product listings for products available at a destination. The system may include at least one processor and a memory device including instructions that, when executed by the at least one processor, cause the system to: obtain destination information from an aircraft data bus, where the destination information may be from a plurality of aircraft information systems located on the aircraft. The system may send the destination information to at least one vendor application programming interface (API) to obtain product details for at least one product that is available for purchase through an inflight entertainment system and may be available to be delivered at a flight destination. The system may receive the product details to display in the inflight entertainment system and send the product details to a client device to be displayed in a graphical user interface of the IFE. The graphical user interface of the inflight entertainment system may allow a passenger on the aircraft to view the product details along with a plurality of product details for a plurality of additional products and to purchase the product through the inflight entertainment system.

A method is provided for providing electronic product listings for products available at a destination. The method may include the operation of obtaining destination information from an aircraft data bus, where the destination information may be from a plurality of aircraft information systems located on the aircraft. The destination information may be sent to at least one vendor API to obtain product details for at least one product that is available for purchase through an inflight entertainment system and the at least one product may be available to be delivered at a flight destination. The method may include receiving the product details to display in the inflight entertainment system and sending the product details to a client device to be displayed in a graphical user interface of the inflight entertainment system. The graphical user interface of the inflight entertainment system may allow a passenger on the aircraft to view the product details with a plurality of product details for a plurality of additional products and to purchase the product through the inflight entertainment system.

A non-transitory machine readable storage medium including instructions embodied thereon is provided. The instructions, when executed by at least one processor may obtain destination information from an aircraft data bus, where the destination information may be from a plurality of aircraft information systems located on the aircraft. The instructions, when executed by at least one processor may send the destination information to at least one vendor API to obtain product details for at least one product that is available for purchase through an inflight entertainment system, and the product may be available to be delivered at a flight destination. The instructions, when executed by at least one processor may receive the product details to display in the inflight entertainment system and send the product details to a client device to be displayed in a graphical user interface of the inflight entertainment system. The graphical user interface of the inflight entertainment system may allow a passenger on the aircraft to view the product details with a plurality of product details for a plurality of additional products and to purchase the product through the inflight entertainment system.

DETAILED DESCRIPTION

Figure 1:
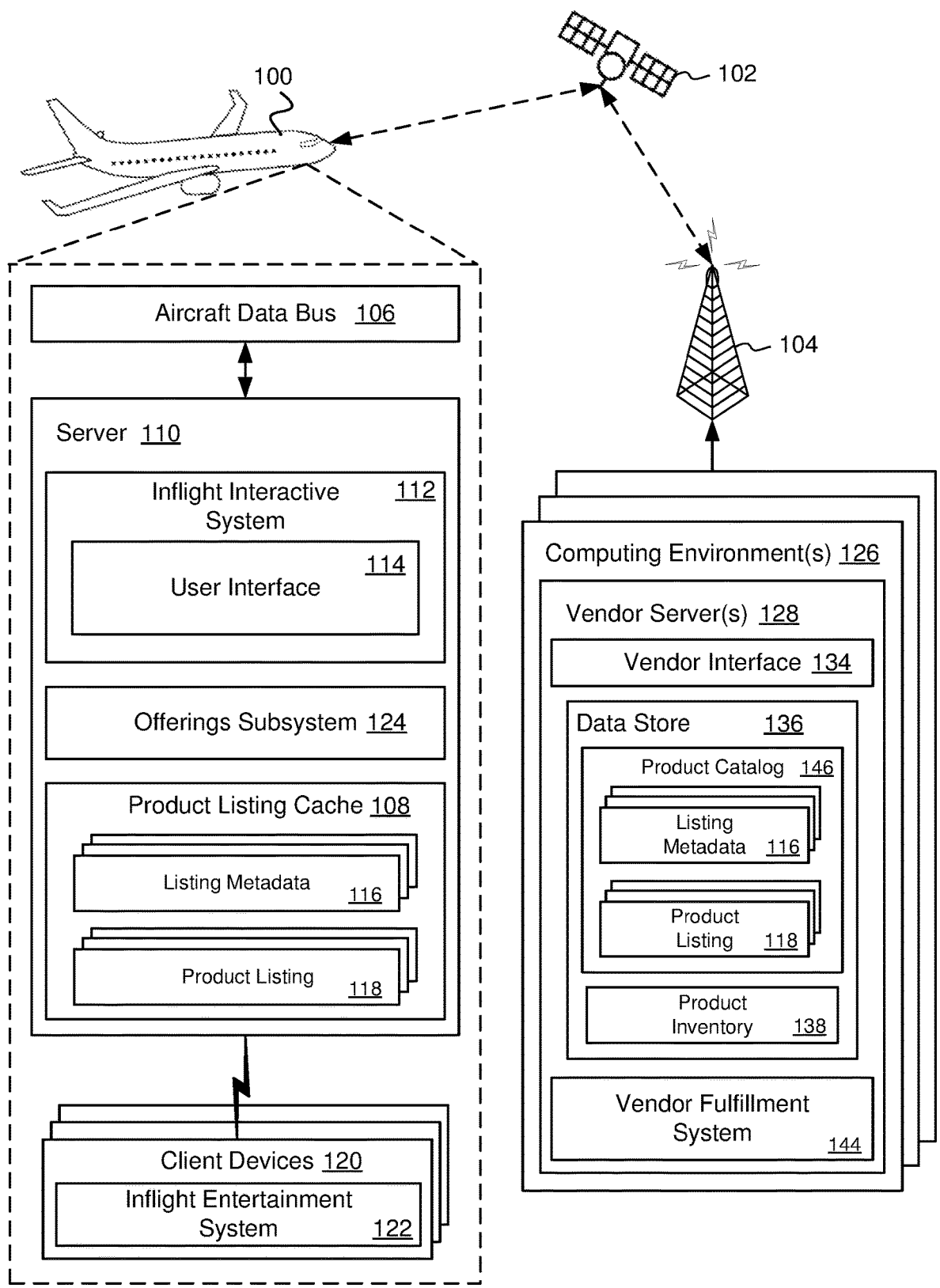
FIG. 1 is a block diagram illustrating an example system for providing destination-specific product listings to passengers on an aircraft.

FIG. 1 is a block diagram illustrating one example of a system located onboard an aircraft 100. The system is configured to provide electronic product listings 118 containing product details to an inflight entertainment system (IFE) 122, where the product listings 118 feature destination-specific products that can be purchased through the IFE 122. The examples herein may describe products available at a destination, but it will be understood that any specifics associated with products also similarly apply to services and the like available at the destination. The aircraft 100 may be one of multiple aircraft which are included in a fleet of aircraft. A server 110 onboard the aircraft 100 may include an inflight interactive system 112 configured to provide a passenger with the IFE 122. The term "passenger" is used herein to refer to a passenger on the aircraft 100 who is also a customer who shops for products via product listings 118 displayed in the IFE 122 and who is provided with purchased products or services at a destination or another location.

Passengers of the aircraft 100 can access the IFE 122 using client devices 120. The inflight interactive system 112 may include a user interface 114 to allow the passengers to access the IFE 122 via the user interface 114. Illustratively, the user interface 114 can be provided (e.g., transmitted to a client device 120) to enable the passengers on the aircraft 100 to shop, view movies and television programs, listen to audio, play electronic games, and the like. In particular, the IFE 122 may enable a passenger to view a product listing 118 for a product available at a destination, and enable the passenger to purchase the product via the product listing 118. The purchased product can be delivered to the passenger at the destination, the passenger can pick up the product from a vendor (e.g., a vendor shop or store) located at the destination, the product can be provided to the passenger using a different delivery method, and so forth.

The product listings 118 may be provided to the passengers through a graphical user interface of an IFE 122 on client devices 120. The product listings 118 may be organized into categorized groupings of products (e.g., electronics, clothing and accessories, health and beauty products, wines and spirits, perfumes, etc.). A product listing 118 can be included on: a web page, an application page, an electronic document, other media, and the like. The product listing 118 may include product details (e.g., a product name and information describing the product) for a product available at a specific destination (e.g., airport or city), and the product listing 118 may allow a passenger to purchase the product prior to arriving at the destination, shortly after arriving at the destination while waiting to disembark the aircraft 100, and so forth. After arriving at the destination, the product can be delivered to the customer (e.g., at an airport terminal or gate, hotel, etc.) or the customer can pick up the product from a specified location (e.g., a store) at the destination. Alternatively, as described later in association with FIG. 4, a product purchased via a product listing 118 displayed in the IFE 122 may be delivered to the passenger while onboard the aircraft 100. In some embodiments, where the product is actually a service, the passenger may receive or experience the service upon arrival, onboard the aircraft 100, and so forth.

As illustrated, the server 110 onboard the aircraft 100 may host various systems and subsystems used to implement the IFE 122. The server 110 may include the inflight interactive system 112, an offerings subsystem 124, and other subsystems as can be appreciated. The offerings subsystem 124 may be configured to obtain a plurality of product listings 118 associated with a destination and provide the product listings 118 to passengers through the IFE 122. In one example configuration, the offerings subsystem 124 obtains destination information from an aircraft data bus 106 and sends the destination information to a plurality of vendor servers 128 with a request for product listings 118 for products or services that are available for purchase at or otherwise associated with the destination. The destination information obtained from the aircraft data bus 106 may be an aircraft destination (e.g., a destination city, airport, arrival terminal, arrival gate, etc.). In one example described later in association with FIG. 2, the destination information can include a passenger destination (e.g., a final destination of a passenger which may be different from an aircraft destination) or a combination of the passenger destination and the aircraft destination. The aircraft data bus 106 may receive aircraft flight information from a plurality of aircraft information systems, including navigation systems, weather systems, communications systems, aircraft networks, and other avionics, located on the aircraft 100. Generally, the aircraft flight information available from the aircraft data bus 106 is information that is specific to the aircraft 100 for a specific time period. As an example, the aircraft flight information may include: an aircraft origin, an aircraft destination, an estimated arrival time, an arrival gate, a current latitude and longitude of the aircraft, a current aircraft speed, a current aircraft altitude, a passenger service status (e.g., meal service, drink service, etc.), an origin weather report, a destination weather report, detour information, as well as other information available from the aircraft information systems. The aircraft information systems located on the aircraft 100 may communicate the aircraft flight information to each other using the aircraft data bus 106. In some embodiments, the destination information for the aircraft 100 comprises one or more of the aircraft destination, an estimated arrival time, an arrival gate, destination weather information, and any other information related to the destination that is available to systems on the aircraft 100.

In one example, the offerings subsystem 124 sends the destination information to the plurality of vendor servers 128 using vendor interfaces 134. The vendor servers 128 may be located off the aircraft 100 in computing environments 126 (e.g., private cloud environment, a data center, centralized hardware servers, a data warehouse, etc.), and communication between the offerings subsystem 124 and the vendor servers 128 can be performed over a satellite network that includes a plurality of satellites 102 and ground stations 104 in network communication with other types of computer networks. In one example, each vendor server 128 may be associated with an individual vendor (e.g., duty-free shop, fashion store, book store, etc.). In another example, the vendor server 128 may aggregate the product listings 118 for a plurality of vendors.

The vendor server(s) 128 may manage product listings 118 included in product catalogs 146 stored in a data store 136 on behalf of one or more vendors. A vendor may be a business, organization, government agency, individual, or other third-party that supplies notifications, advertisements, information, etc., regarding their destination-specific products and/or services through the inflight interactive system 112. The product listing 118 managed by the vendor server 128 may contain product details presented using one or more electronic elements comprising: text, images, electronic links, audio, animations, games, video, etc., which identify a product and various aspects of the product (e.g., colors, models, configurations, functions, dimensions, weight, cost, warranty, manuals, etc.). The product listing 118 may be interactive such that a passenger can interact with the product listing 118. Listing metadata 116 or tags can be assigned to the product listing 118. The listing metadata 116 may further describe the product listing 118. For example, the listing metadata 116 may describe one or more of a vendor, a product, a shipper and other aspects of the product listing 118. The listing metadata 116 may include information that links the product listing 118 with the destination information, such as an address, city, zip code, area code, landmark, and other types of location-identifying information. As a non-limiting example, the listing metadata 116 for the product listing 118 can describe an airport terminal location (e.g., Fiumicino terminal 1) of a duty-free shop that sells the product in the product listing 118, and the airport terminal location can be linked to the destination of the aircraft 100 (e.g., Rome—Fiumicino International Airport).

The vendor interface 134 for the vendor server 128 may be configured to identify the one or more product listings 118 in the product catalog 146 that is associated with the destination information provided by the offerings subsystem 124 of the server 110 and to determine whether the product in the product listing 118 is available at a location associated with the destination information. The vendor interface 134 can include a vendor application programming interface (API) configured to receive the request for the product listing 118 from the server 110 located on the aircraft 100. As introduced above, the request can include the destination information obtained from the aircraft data bus 106. In response to receiving the request, the vendor interface 134 may identify the product listing 118 that has listing metadata 116 that links the product listing 118 with the destination information and determines whether the product in the product listing 118 is available at the location associated with the destination information. For example, the vendor interface 134 may be configured to query the product catalog 146 for the product listing 118 having listing metadata 116 that associates the product listing 118 with the destination information comprising the aircraft destination. In one example, the product details included in a product listing 118 may specify whether the product or service in the product listing 118 is physically available at a destination. In another example, the vendor interface 134 may query a product inventory 138 (e.g., a product and/or service inventory database) to determine whether the product is physically available at a location associated with the destination information. As a non-limiting example, in response to a request received from the offerings subsystem 124 specifying an arrival gate or terminal, the vendor interface 134 may query a product catalog 146 for product listings 118 associated with the arrival gate or terminal. The query may return product listings 118 for a duty-free shop, restaurant, and so forth located in an airport terminal that includes the arrival gate. In some embodiments, the vendor interface 134 may then query the product inventory 138 for the duty-free shop, restaurant, and so forth to verify that the products featured in the product listings 118 are in stock at the duty-free shop.

In the case that the vendor interface 134 identifies a product listing 118 that corresponds to destination information and product availability, the vendor interface 134 sends the product listing 118 over the satellite network 102/104 to the server 110 located on the aircraft 100. The listing metadata 116 for the product listing 118 can also be sent to the server 110 to allow the offerings subsystem 124 to use the listing metadata 116 to categorize and group product listings 118.

The offering subsystem 124 may be configured to request product listings 118 from the vendor servers 128 at any time, including prior to takeoff, during the flight, and after landing during a time in which passengers waiting to disembark the aircraft 100 may be using the IFE 122. In one example configuration, the offering subsystem 124 can evaluate aircraft flight information to determine a current status of a flight (e.g., parked at a gate, takeoff, in-flight, or landing) and determine whether to obtain the product listing 118 for display in the IFE 122 based in part on the current status of the flight. As one example, the offering subsystem 124 may request product listings 118 from the vendor servers 128 when the aircraft 100 is on the ground or at a gate due to increased costs associated with receiving data when the aircraft 100 is inflight. As another example, in order to provide passengers with the most up-to-date product offers, the offering subsystem 124 may wait to request product listings 118 from the vendor servers 128 until the aircraft 100 is within a distance (e.g., 100 miles) of the destination or landing at the destination. As yet another example, the current status of the flight may indicate a change in destination due to weather or some other event, and the offering subsystem 124 can obtain an updated set of product listings 118 from the vendor servers 128 using the new destination while in flight soon after the change in destination to provide the passengers with sufficient time to appropriately plan for or accommodate the change.

In one example, the server 110 may include a product listing cache 108 and the offering subsystem 124 may temporarily store the product listings 118 in the product listing cache 108, for example, for a duration of a flight or a portion of the flight. The inflight interactive system 112 may access the product listing cache 108 and retrieve the product listings 118 for display in the IFE 122. In one example, the offering subsystem 124 can periodically update the product listing cache 108 with current product listings 118 and listing metadata 116 obtained from the vendor servers 128. During times that communication with the vendor servers 128 cannot be established (e.g., a satellite network used to communicate with the vendor servers 128 is unavailable), the inflight interactive system 112 can obtain product listings 118 stored on the aircraft 100 from the product listing cache 108 for display in the IFE 122.

The offering subsystem 124 can organize product listings 118 received from the vendor servers 128 into categorized groupings of products, and provide the categorized groupings of products to passengers via the IFE 122. In one example, the offering subsystem 124 can associate a product listing 118 with a categorized grouping of products using listing metadata 116 received from the vendor servers 128. For example, the product listings 118 may span a variety of categories, such as electronics, clothing, jewelry, health and beauty products, souvenirs, etc., where each category may include sub-categories. As a non-limiting example, an electronics category can include phones, tablets, laptops, headphones, and the like. The offering subsystem 124 can evaluate listing metadata 116 for a product listing 118 and assign the product listing 118 to a corresponding categorized grouping. In some embodiments, each product listing 118 may be assigned to one or more categories.

The inflight interactive system 112 may send, broadcast, transmit, or otherwise make available the IFE 122 to a client device 120 onboard the aircraft 100. The inflight interactive system 112 includes a user interface 114, which can comprise a graphical user interface (GUI) of a web application that can be sent to the client devices 120. The user interface 114 may include interface controls to access a home screen, media content, shopping information, aircraft information, and the like. Furthermore, the user interface 114 for the IFE 122 provides access to the destination-specific, categorized groupings of product listings 118. For example, the user interface 114 may include an electronic link, a tab, a button, a menu item, a list, or other interface control linked to the categorized groupings of product listings 118.

A passenger can browse the various destination-specific categorized groupings of product listings 118 using a client device 120 and purchase products featured in the product listings 118 through the IFE 122. For example, the IFE 122 may display a product page with a product listing 118 and may include a user interface control (e.g., a purchase control) configured to execute a transaction request to purchase the product listed in the product listing 118. In one example, the passenger using the client device 120 can purchase the product in the product listing 118 by selecting a purchase control displayed in the IFE 122. In response to selecting the purchase control, the passenger may be prompted for payment information and delivery instructions. The passenger may enter payment details, such as credit card or other electronic payment systems (e.g., PayPal®, Venmo®, debit cards, cryptocurrency, or similar systems). The passenger may also indicate that the passenger will receive the product at a delivery location (e.g., an arrival gate, hotel address, home address, etc.) or indicate that the passenger will pick up the product from a vendor location (e.g., a store or shop). In one example, the product in the product listing 118 may be available for customer-home delivery.

The client device 120 may receive the information submitted by the passenger and send a transaction request to the offerings subsystem 124 located on the server 110. The transaction request sent by the client device 120 may be a message that includes product information, passenger information, payment information, and if needed, delivery/pick up information. The offerings subsystem 124, in response to receiving the information included in the transaction request, may generate a message that includes the information, and the offerings subsystem 124 may send the message to a vendor fulfillment system 144 on the vendor server 128 to allow the vendor to complete the purchase of the product. For example, the vendor fulfillment system 144 may notify the vendor of the purchase of the product, and the vendor can make arrangements to deliver the product to the passenger or provide the product to the passenger at the vendor's location.

A client device 120 may comprise, for example, processor-based systems. More specifically, the client device 120 may be a personal electronic device, such as, but not limited to, a mobile phone, a laptop, notebook, or tablet computer, a handheld computer or mobile computing device, or any other device with similar capabilities. The client device 120 may be a personal electronic device or may be property of an aircraft operator. In another example, the client device 120 may be a seatback system installed on a passenger seat of the aircraft 100.

In one configuration, the server 110 may communicate with the client device(s) 120 via a network. The network may include any useful computing network, including a localized network, a wired data network, a wireless data network, or any other such network or combination thereof. For example, a connection between the client device 120 and the server 110 may be a wireless connection established via a wireless access point (shown in FIG. 8) or a wired connection. Components utilized for such a system may depend at least in part upon the type of network and/or environment selected. In one example, the wireless connection between the server 110 and the client device(s) 120 may be established using Transmission Control Protocol/Internet Protocol (TCP/IP), and services in the server 110 may be web services that are RESTful. A wireless access point (shown as wireless access point 156 in FIG. 3 and WAP 780 in FIG. 7) that facilitates data traffic between the server 110 and the client device(s) 120 may operate using a WI-FI protocol, a BLUETOOTH protocol, or another appropriate wireless protocol.

The passenger, via the client device 120, can select a destination-specific, categorized groupings (e.g., of products and/or services) and be presented with one or more product listings 118 that fall within the categorized grouping(s). As described earlier, the product listings 118 may use a plurality of electronic objects 162 (e.g., electronic links, web pages, application pages, text, images, audio or video, apps, animations, plugins, etc.) and/or interface controls used to provide details for a product available at the destination. The passenger, while in route to a destination, can view the product details in the product listing 118 and purchase the product featured in the product listing 118.

Figure 2:
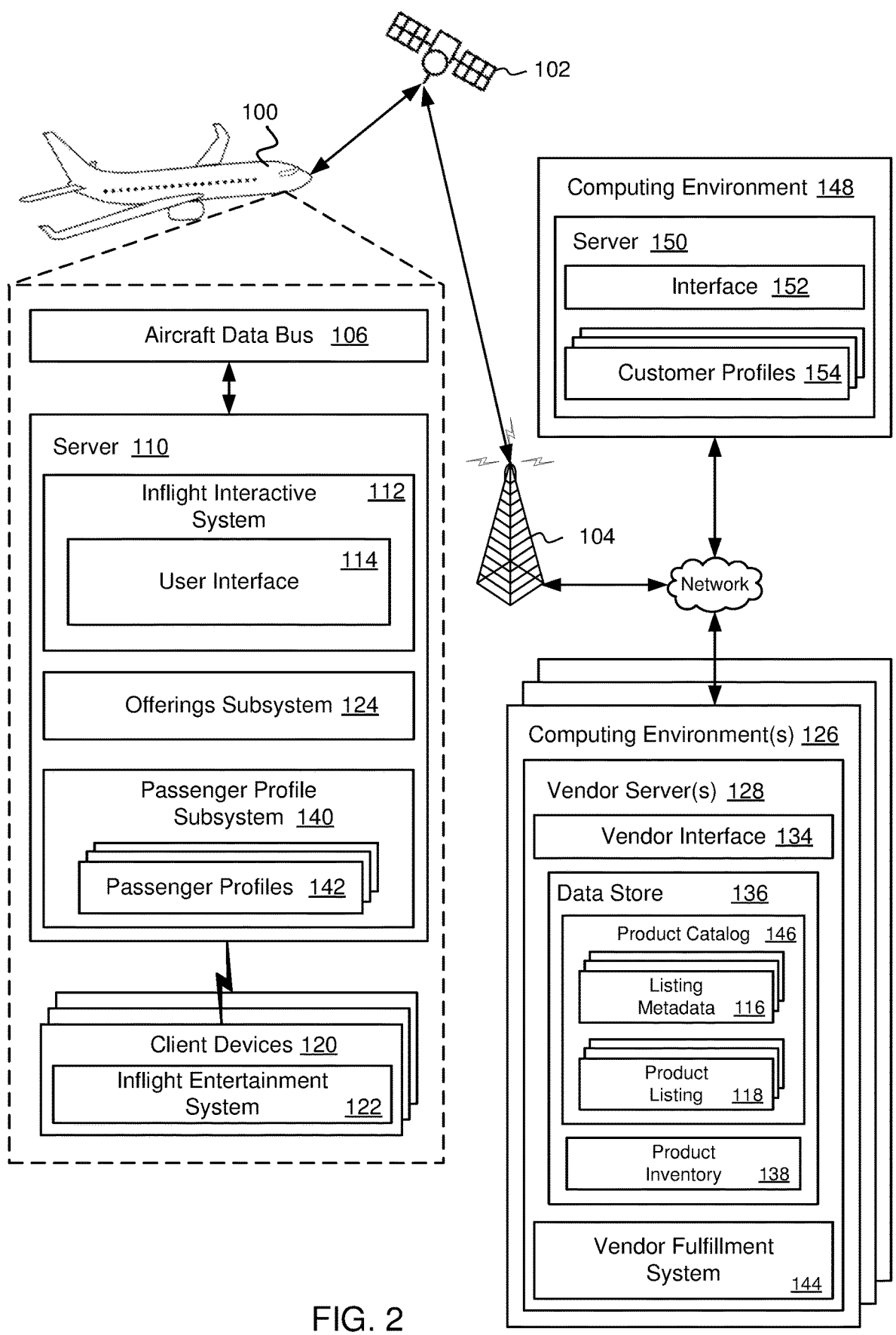
FIG. 2 is a block diagram illustrating another example system for providing destination-specific product listings to passengers on an aircraft using passenger profiles.

FIG. 2 is a block diagram illustrating an example of a system that utilizes a passenger profile subsystem 140 to provide personalized or targeted destination-specific product listings 118 to passengers on the aircraft 100. The server 110 located onboard the aircraft 100 may operate a passenger profile subsystem 140 configured to obtain passenger information for passengers on the aircraft 100. Passenger information for a passenger may be used to identify destination-specific product listings 118 that may be of interest to the passenger. The passenger information can include demographic information, itinerary information that describes travel of the passenger, and/or interest information for the passenger, and so forth. The interest information can include one or more behavioral attributes of the passenger, such as a propensity to purchase certain products, interests related to searches, previously consumed media content by the passenger, previously purchased products and services, travel history, etc.

In one example, the passenger profile subsystem 140 may create a passenger profile 142 for the passenger on the aircraft 100 based on input (e.g., user profile information) received from the client device 120 associated with the passenger. For example, the passenger profile subsystem 140 may receive demographic information, itinerary information, and/or interest information from the client device 120, and use this information to create the passenger profile 142. In one example, the passenger may provide passenger information during or before a flight by inputting the passenger information into the user interface 114 of the inflight interactive system 112. For example, the user interface 114 may prompt the passenger to provide passenger information using a series of questions, checkboxes, forms, etc. The passenger profile subsystem 140 may receive passenger information input by the passenger and create a locally stored passenger profile 142 for the passenger.

Additionally, or alternatively, the passenger profile subsystem 140 may obtain a customer profile 154 associated with the passenger from an off-board server 150 associated with, for example, an aircraft operator or other third party entity. The server 150 may be located in a computing environment 148 (e.g., a private cloud environment, a data center, centralized hardware servers, a data warehouse, etc.). The server 150 may manage customer profiles 154 or other itinerary or similar information for passengers, crew, and so forth. The customer profiles 154 may include demographic information, itinerary information, customer interest information, etc. In one example, the customer interest information included in the customer profiles 154 may include one or more preferences, such as certain products that are of interest to the passenger (e.g., electronic devices, fashion, sports cars, etc.), activities that are of interest to the passenger (e.g., hiking, skiing, hunting, yoga, etc.) that may be used to identify related products (e.g., athletic wear and sporting equipment), life stages of the passenger, and so forth. In other words, the customer interest information may describe behavioral attributes of the passenger (e.g., a propensity to consume certain types of content or perform certain types of activities) that may be used to customize or personal selection of products for the passenger.

The off-board server 150 may make the customer profiles 154 available to the passenger profile subsystem 140. For example, the server 150 may include an interface 152, such as an API, and the passenger profile subsystem 140 may send a request to the API that includes identifying information for the passenger (e.g., customer number, seat and flight number, name, frequent flyer number, etc.). In response to receiving the request, the server 150 may identify the customer profile 154 or the other information associated with the identifying information, and the API may send the customer profile 154 or other information to the server 110 located onboard the aircraft 100 to allow the passenger profile subsystem 140 to create a locally stored passenger profile 142 using the information in the customer profile 154 or the other information.

In addition to demographic information, itinerary information, and/or customer interest information, a customer profile 154 or other information obtained from the off-board server 150 can include previous electronic activities of the passenger while onboard previous flights, such as movies or music consumed by the passenger, advertisements interacted with by the passenger, websites visited by the passenger, products browsed or researched, etc. The information in the customer profile 154 can be used to create the passenger profile 142 for the passenger for use during the current or future flight. During the flight, the passenger profile subsystem 140 may update the passenger profile 142 to include electronic activities of the passenger while onboard the aircraft 100. Also, the passenger profile subsystem 140 can send the electronic activities of the passenger while on the current flight to the off-board server 150 so that the electronic activities can be included in the passenger's customer profile 154 managed by the off-board server 150.

Passenger profiles 142 created by the passenger profile subsystem 140 may be made available to the offering subsystem 124. As indicated above, a passenger profile 142 may include itinerary information specifying a final destination for a passenger. The passenger destination specified in the passenger profile 142 may be different from a destination of an aircraft 100 obtained from the aircraft data bus 106. More specifically, the destination obtained from the aircraft data bus 106 may be a destination of the aircraft 100 and not the final destination of the passenger onboard the aircraft 100. For example, after arriving at the aircraft destination, the passenger may take a connecting flight or other transportation (e.g., train or car) to the passenger's final destination. Accordingly, the offerings subsystem 124 may obtain the passenger's final destination from the passenger profile 142, and the offerings subsystem 124 may use the passenger's final destination to identify product listings 118 associated with the passenger's final destination (or any interim destination) and provide the product listings 118 to the passenger via the IFE 122.

The offerings subsystem 124 can use other types of passenger information (e.g., demographic information, customer interest information, onboard activity information, etc.) obtained from the passenger profile 142 to identify product listings 118 that may be of interest to the passenger based on the passenger information. In one example, the offering subsystem 124 may send the passenger information obtained from the passenger profile 142, along with destination information (e.g., aircraft destination and/or passenger destination) to the vendor servers 128 described earlier. The vendor servers 128 may use the passenger information and the destination information to identify destination-specific product listings 118 having listing metadata 116 that corresponds to the passenger information. The vendor servers 128 may then return the destination-specific product listings 118 to the server 210 so that the product listings 118 are available to the offering subsystem 124. Thus, the offerings subsystem 124 may use the passenger information to provide customized or passenger specific product listing 118. As an example, the passenger profile 142 may indicate that the passenger is a female and is interested in European fashion. The offering subsystem 124 may send an API request to the vendor servers 128 for product listings 118 that feature European fashion products which are available at the destination. The vendor servers 128 may identify product listings 118 for European fashion products sold by vendors at the destination and send the product listings 118 to the server 210 to allow the offering subsystem 124 to provide the product listings 118 to the passenger via the IFE 122.

In another example, the offerings subsystem 124 may use passenger information obtained from the passenger profile 142 to identify locally stored product listings 118 in the product listing cache 108 on the aircraft 100 (shown in FIG. 1) that may be of interest to the passenger. For example, the offerings subsystem 124 can query the product listing cache 108 using the passenger information to identify product listings 118 that have listing metadata 116 that corresponds to the passenger information. Additionally, in one example, product listings 118 that have been identified using passenger information from the passenger profile 142 may be promoted or targeted to the passenger through the IFE 122. For example, a vendor associated with the product listing 118 can elect to have the product listing 118 sponsored when passenger information indicates that the passenger may be interested in the vendor's products and one or more of the vendor's products are available at an aircraft and/or passenger destination. The offerings subsystem 124 may sponsor the product listing 118 by placing the product listing 118 before other product listings 118 in a categorized grouping of products, by emphasizing the product listing 118 in some way (e.g., using bold text, bright color scheme, animations, etc.), and so forth.

In one example configuration, the offerings subsystem 124 may provide destination-specific product listings 118 to passengers at particular times or events during the flight. For example, some products in product listings 118 may be more relevant to passengers at particular times during the flight. As one example, product listings 118 related to wine and spirits available at a destination duty-free shop may be of more interest to passengers around a time that snacks or meals are being distributed to the passengers. As another example, passengers may be interested in viewing product listings 118 for destination-specific souvenirs after watching a travel show in the IFE 122 related to the destination.

Accordingly, in one example, the offerings subsystem 124 may monitor aircraft flight information obtained from the aircraft data bus 106 for events that may correspond to an opportunity to promote a product listing 118 to passengers. As an example, the offerings subsystem 124 may monitor an aircraft latitude and longitude, an aircraft altitude, a seatbelt warning status, an announcement related to turbulence, safety, food service, a weather report, an estimated arrival time, an arrival gate, detour information, etc. In response to detecting an event (e.g., an announcement that a meal service is starting), the offerings subsystem 124 may obtain a product listing 118 featuring a product which may be of interest to passengers on the aircraft 200 during or following the event. The offerings subsystem 124 may then provide the product listing 118 to the IFE 122 to allow the passengers to view the product listing 118. The offerings subsystem 124 may obtain the product listing 118 from the off-board vendor servers 128 or from the onboard product listing cache 108 shown in FIG. 1. Listing metadata 116, such as a key-value pair, which associates the product listing 118 with the event may be assigned to the product listing 118, and the offerings subsystem 124 may use the listing metadata 116 to identify the product listing 118 when the event is detected. The offerings subsystem 124 may sponsor the product listing 118 by placing the product listing 118 before other product listings 118 contained in a categorized grouping, emphasize the product listing 118 in some way, such as using text to indicate sponsorship, bold text, a bright color scheme, animations, etc., and so forth. For example, as illustrated in FIG. 5C, a product control 510 to a product listing can be sponsored by highlighting the product control 510 and/or using text (e.g., "sponsored") to indicate that the product is being sponsored or promoted.

Referring again to FIG. 2, in one example, passenger interaction with the IFE 122 can be captured. For example, interaction data associated with passenger activities such as viewing movies and shows, playing video games, browsing the internet, etc. can be generated and the interaction data can be saved to a local passenger profile 142 associated with the passenger. In one example, the interaction data can also be sent to the server 150 to update the customer profile 154 associated with the passenger with the interaction data. The offerings subsystem 124 may monitor passenger interaction with the IFE 122 and identify the product listing 118 that corresponds to the passenger interaction and is available at an aircraft and/or passenger destination. As an example, the offerings subsystem 124 may monitor media (e.g., inflight movie or show) viewed by the passenger and determine whether metadata for the media corresponds to listing metadata 116 for a destination-specific product listing 118. As a specific example, metadata for a movie viewed in the IFE 122 may specify a high-end wristwatch worn by a primary character in the movie that is available for purchase from a vendor in a destination city to which the passenger is traveling. The offerings subsystem 124 can use the metadata to identify a product listing 118 for the wristwatch and display the product listing 118 in the IFE 122 to allow the passenger to view the product listing 118 and purchase the wristwatch.

Figure 3:
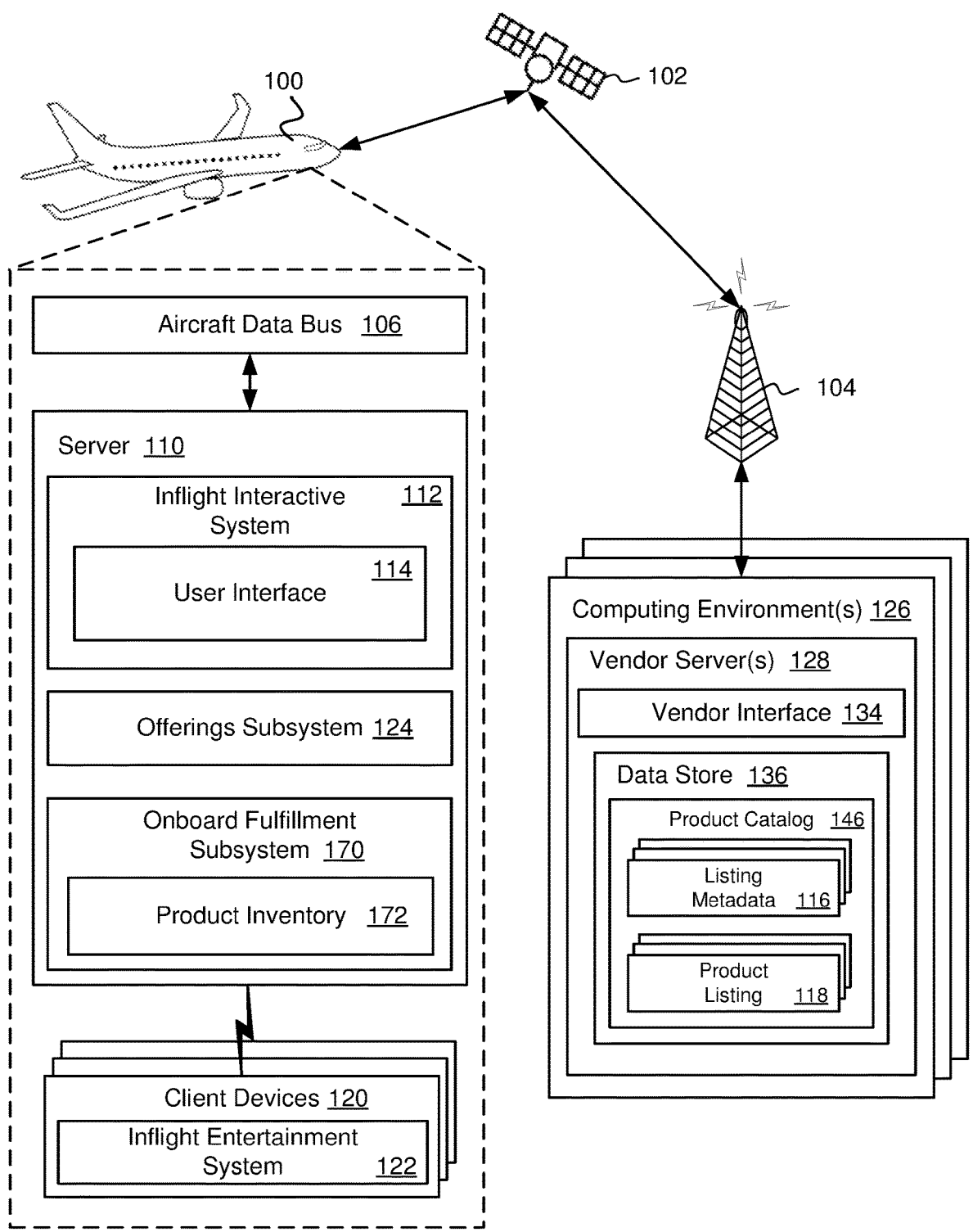
FIG. 3 is a block diagram illustrating an example system for an onboard fulfillment subsystem used to deliver products to passengers on an aircraft.

FIG. 3 is a block diagram illustrating another example of a system that includes an onboard fulfillment subsystem 170 used to deliver products to passengers on the aircraft 100 who purchased the products via product listings 118 displayed in the IFE 122. Illustratively, a limited number of products may be available for sale onboard the aircraft 100. A passenger may view a product listing 118 for a product available for sale onboard the aircraft 100 in the IFE 122 and purchase the product via the product listing 118. The purchased product can then be delivered to the passenger while the passenger is onboard the aircraft 100.

The offerings subsystem 124 may enable a passenger to interact with a product listing 118 via the user interface 114 of the IFE 122 and purchase the product. In one example, the product listing 118 may indicate whether the product is available for onboard delivery. For example, the offerings subsystem 124 may determine whether the product is available for onboard delivery by requesting product inventory information from the onboard fulfillment subsystem 170, and the offerings subsystem 124 may include availability information for the product in the product listing 118 (or product page) displayed in the IFE 122. Also, in one example, the product listing 118 may indicate that a passenger has the option of having the product delivered onboard the aircraft 100 when the current location of the aircraft allows delivery of the product (e.g., duty free products, regulated products, etc.) when the aircraft 100 is at a gate or in-flight, or the product can be provided to the passenger using another method (e.g., delivered or picked up at a destination).

The offerings subsystem 124 may enable the passenger to enter payment details, such as credit card or other electronic payment systems (e.g., PayPal, Venmo, debit cards, cryptocurrency, or similar systems). Also, the passenger may indicate a delivery location (e.g., a specific seat number) or provide identifying information used to determine an onboard location of the passenger, such as a seat number obtained from the passenger profile 142 (shown in FIG. 2). Alternatively, the seat number associated with the client device 120 (e.g., a seatback client device) used by the passenger can be obtained and used as the delivery location. In response to receiving purchase details for the product, the offerings subsystem 124 may send a fulfillment request to the onboard fulfillment subsystem 170.

The onboard fulfillment subsystem 170 may receive a fulfillment request to deliver the product to the passenger onboard the aircraft 100. In one example, the onboard fulfillment subsystem 170 may add the fulfillment request to a queue of outstanding fulfillment requests for the aircraft 100 and a crew member may be notified of the fulfillment request and deliver the product to the passenger.

In one example, the onboard fulfillment subsystem 170 may maintain a product inventory 172. The product inventory 172 may indicate a current inventory of products available on the aircraft 100. In a specific example, the product inventory 172 may include a listing of the number of products that are available for purchase on the aircraft 100. The onboard fulfillment subsystem 170 may track and update the products in the product inventory 172 in near real-time to reflect an up-to-date listing of products and the number of products available for purchase on the aircraft 100. For example, the onboard fulfillment subsystem 170 may update the product inventory 172 when an onboard product order is fulfilled. As an example, after delivering a product to a passenger, a crew member may provide an indication to the onboard fulfillment subsystem 170 (e.g., by selecting a "delivered" user interface control) that the product has been delivered to the passenger. After receiving the indication that the product has been delivered, the onboard fulfillment subsystem 170 may update the product inventory 172 to show that the product has been purchased.

Figure 4:
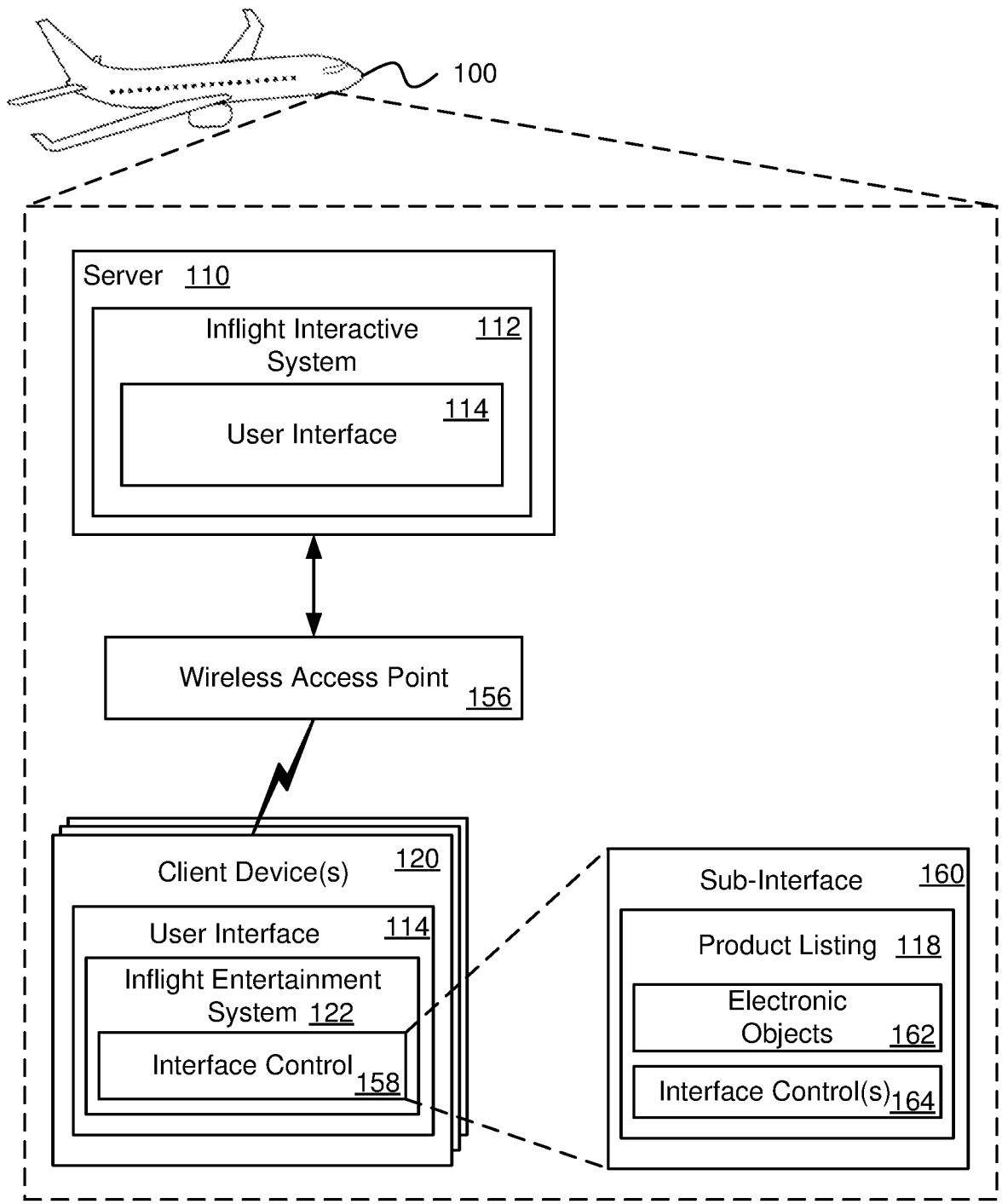
FIG. 4 is a block diagram illustrating an example system for providing an inflight entertainment system to client devices and for displaying destination-specific product listings.

FIG. 4 is a block diagram illustrating an example of a system for providing the IFE 122 via the infight interactive system 112 to the client devices 120. As described earlier, the server 110 onboard the aircraft 100 may provide the user interface 114 to the client devices 120. The user interface 114 may enable access to both the IFE 122 and product listings 118 for products. The IFE 122 may enable a passenger on the aircraft 100 to watch movies and television programs, listen to audio, play electronic games, browse shopping electronic pages, etc. The IFE 122 may include the interface control 158 to access categorized groupings of destination-specific product listings 118 (e.g., an electronic retail store). The interface control 158 may be the graphical user interface (GUI) control, including but not limited to, an electronic link, a tab, a button, menu item, etc., where the interface control 158 may be used to access the categorized groupings of destination-specific product listings 118.

The product listing 118 may include a plurality of electronic objects 162 (e.g., electronic links, web pages, application pages, text, images, audio or video, apps, animations, plugins, etc.) and/or interface controls 164. The product listing 118 may be displayed through the sub-interface 160 provided to the client device 120. For example, selecting the interface control 158 on the IFE 122 displayed through the user interface 114 may cause a categorized grouping of product listings 118 to be opened and displayed through the sub-interface 160. Selecting the individual product listing 118 from a categorized grouping of product listings 118 may cause the selected product listing 118 to be opened and displayed through the sub-interface 160. The individual product listing 118 may contain product details and the user interface control that enables the passenger to view the product and purchase the product featured in the product listing 118.

In the examples described herein, the techniques are described in the context of the aircraft 100. Alternatively, the techniques described for providing the product listing 118 may be provided to a client device 120 on another type of transportation, such as a ship, bus, train, etc.

The various processes and/or other functionality contained within the server(s) 110, 150, 128 may be executed on one or more processors that are in communication with one or more memory modules. The server(s) may include a number of computing devices that are arranged, for example, in one or more server banks or computer banks or other arrangements.

The term "data store" may refer to any device or combination of devices capable of storing, accessing, organizing and/or retrieving data, which may include any combination and number of data servers, relational databases, object-oriented databases, cluster storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

FIGS. 1-4 illustrate that certain processing modules or subsystems may be discussed in connection with this technology. In one example configuration, a module or subsystem may be considered a service with one or more processes executing on a server or other computer hardware. For example, modules or subsystems providing services may be hosted in a server located on or off an aircraft or other vehicle. An application programming interface (API) may be provided for each module or subsystem to enable a second module or subsystem to send requests to and receive output from a first module or subsystem. Such APIs may also allow third parties to interface with the module or subsystem and make requests and receive output from the modules or subsystems. While FIGS. 1-4 illustrate examples of systems that may implement the techniques above, many other similar or different environments are possible. The example environments discussed and illustrated above are merely representative and not limiting.

Figure 5A:
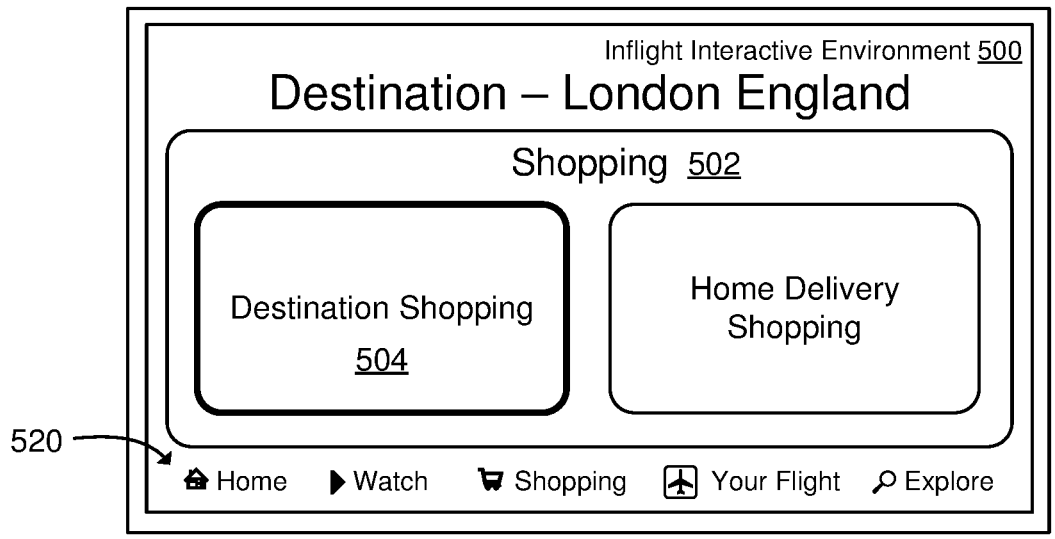
FIGS. 5A-E are diagrams illustrating an example IFE as having an interface that enables a passenger to view and navigate destination-specific product listings.
Figure 5B:
Figure 5C:
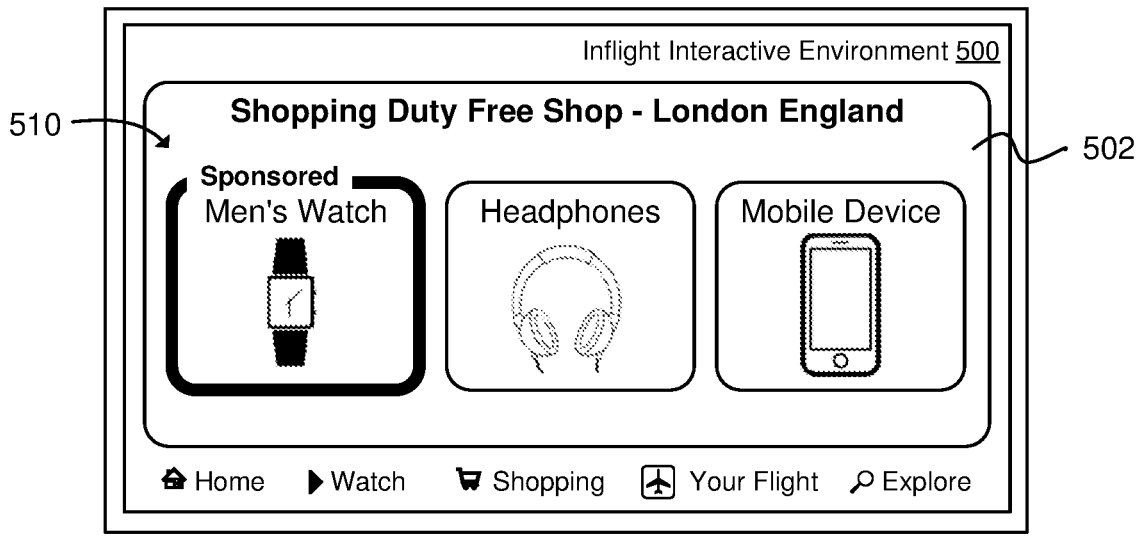

Referring generally to FIGS. 5A-E, an example IFE 500 is illustrated as having an interface that enables a passenger to access IFE features (e.g., media, shopping, flight information, etc.) and a plurality of sub-interfaces used to navigate to destination-specific product listings available at a destination such as London, England. FIG. 5A illustrates the IFE as having controls 520 to access a home screen, inflight media, inflight shopping, flight information, and the like. The IFE also includes an example shopping sub-interface 502 which provides passengers with various shopping options. As illustrated, the shopping sub-interface 502 includes a destination shopping control 504 which a passenger can select to browse categorized groupings of destination-specific products available for purchase via product listings in the IFE 500. Selecting the destination shopping control 504 option (as indicated in FIG. 5A by the bold line) loads a plurality of labeled controls 506 into the shopping sub-interface 502, as shown in FIG. 5B. The labeled controls 506 may be linked to destination-specific, categorized groups of product listings, such as electronics, jewelry, fashion, duty-free products, wines and spirits, gifts, and accessories, etc.

As shown in FIG. 5B, the label of the control 506 may identify a grouping of destination-specific product listings linked to the control 506. As a specific example, a control 508 labeled "Duty-Free Products" may be linked to a grouping of products available from a duty-free shop located in an airport terminal at a destination city which corresponds to an aircraft and/or passenger destination. The passenger may select the labeled control 506 to navigate to the grouping of destination-specific product listings associated with the label. As a specific example, the passenger can select the control 508 labeled "Duty-Free Products" (as indicated in FIG. 5B by the bold line), and as shown in FIG. 5C, a plurality of product controls 510 associated with a duty-free store may be loaded into the shopping sub-interface 502. A product control 510 may display summary information (e.g., product name, product image, product description, etc.) for a product listing linked to the product control 510. The product controls 510 enable a passenger to access product listings linked to the product controls 510. As a specific example, the product control 510 may be linked to the product listing for a men's wristwatch available to purchase from a duty-free shop in a destination city. The passenger can navigate to the product listing for the wristwatch by selecting the product control 510 linked to the product listing.

Figure 5D:

FIG. 5D illustrates an example product listing 512 in a product page loaded into the shopping sub-interface 502 in the IFE 500. As shown, the product listing 512 can include product details for the product that is available for purchase through the IFE 500 and can be delivered to the passenger at the destination and/or picked up by the passenger at the destination. In addition to the product listing 512, the shopping sub-interface 502 may include a purchase control 522 for purchasing the product in the product listing 512 and one or more instruction controls 524 for providing delivery/pick up instructions to a vendor. The passenger may purchase the product in the product listing 512 by selecting the purchase control 522 and indicating the delivery/pick up preference by selecting an appropriate instruction control 524. In one example, selecting the delivery option may cause the shopping sub-interface 502 to generate a prompt asking the passenger for delivery instructions. For example, the prompt may ask the passenger for an arrival gate number, a hotel address, etc. asking where and how the passenger would like the product delivered. Also, the prompt may ask the passenger for information that can be used to identify the passenger at the arrival gate or another location, such as a name, phone number, photo, etc. for the passenger.

As part of purchasing the product, the passenger may be prompted via the shopping sub-interface 502 for payment information and any other additional information that may be needed to complete the purchase. Also, the passenger may be provided with information for receiving the product, such as a location of a shop or store, or a gate and/or terminal location to meet a store representative. After arriving at the destination, the passenger may be provided with the product using the method indicated by the passenger after the passenger is identified according to the provided information.

Figure 5E:

In one example, as illustrated in FIG. 5E, certain products may be available for onboard delivery based on a current location of the aircraft (e.g., in international airspace or within a jurisdiction of a country). For example, a limited inventory of a product may be maintained onboard the aircraft. The passenger may have the option to have the product (e.g., a regulated product) delivered to the passenger onboard the aircraft. As an example, when a product is available for onboard delivery and the current location of the aircraft allows a sale and delivery of the product, the product listing 512 for the product may indicate that the product is available for onboard delivery, and the shopping sub-interface 502 may include a control 526 that can be selected to have the product delivered to the passenger after purchasing the product. As shown in FIG. 5E, onboard delivery may be one of a plurality of delivery and pick up options, and the passenger may be able to select the option that is preferred by the passenger. The delivery methods displayed for the product in the product listing 512 in the IFE may be based on the availability of the product onboard the aircraft and/or at the destination (e.g., at the destination airport terminal or at the destination city store or shop). For example, the onboard server may verify product availability for the product and display delivery/pick up options that correspond to the product availability.

It will be appreciated that the IFE described in association with FIGS. 5A-E can be used to display any number of sub-interfaces and controls for navigating categorized groupings and individual destination-specific product listings. The interfaces and controls discussed and illustrated above are merely representative and are not meant to be limiting.

Figure 6:
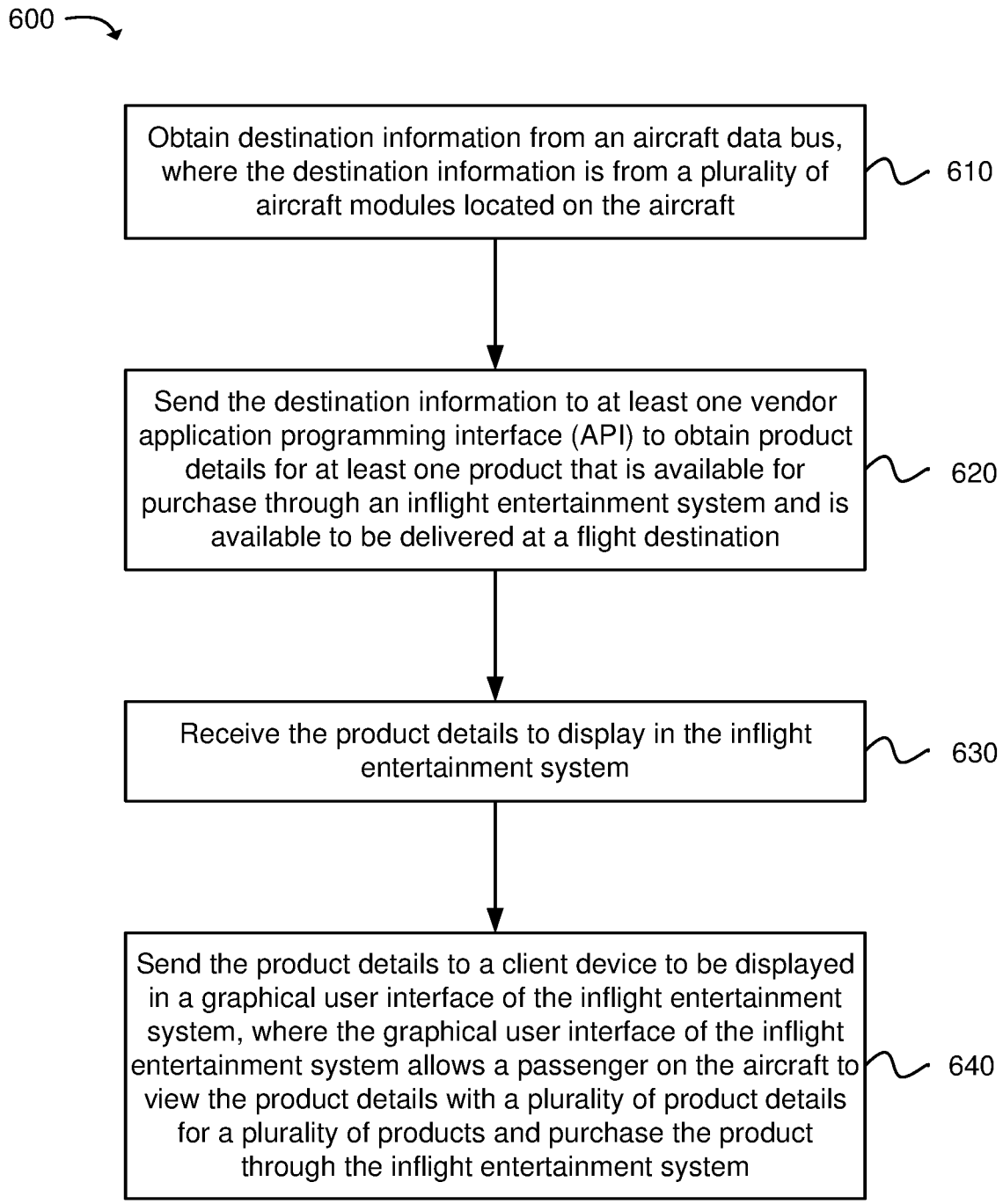
FIG. 6 is a flow diagram illustrating an example method for providing product listings for products available at a destination to passengers on an aircraft.

FIG. 6 is a flow diagram illustrating an example method 600 for providing product listings for products available at a destination. The method 600 may be performed by one or more components referenced in FIGS. 1-4. As in block 610, a server located onboard the aircraft may obtain destination information from an aircraft data bus. The aircraft data bus may receive aircraft flight information from a plurality of aircraft information systems (e.g., avionics systems) located on the aircraft. Generally speaking, the aircraft flight information available from the aircraft data bus is information that is specific to the aircraft. In particular, the aircraft flight information may include an aircraft destination, such as an airport code, destination weather, city, arrival gate, etc. The aircraft flight information may be used in obtaining product details for products that are related in some way to the aircraft destination. In another example, a passenger destination, which may be different from an aircraft destination and comprise one or more of an airport code, destination weather, city, arrival gate, etc., may be used to obtain product details for products that are associated with the passenger destination.

As in block 620, the onboard server may send the destination information to at least one vendor application programming interface (API) to obtain product details for at least one product which is available for purchase through an inflight entertainment system and is available to be delivered at a flight destination. The product details can include product: colors, models, configurations, functions, dimensions, weight, cost, warranty, manuals, etc. The product details can be provided in text, images, electronic links, audio, animations, games, video, etc.

In one example, the vendor API can comprise a plurality of vendor APIs for a plurality of vendor servers located off-board the aircraft in data centers or in other environments and locations. The vendor API may be for a vendor server associated with a product vendor (e.g., shop, store, etc.), and the vendor server may be configured to determine whether one or more products in a product catalog are available for delivery at a flight destination based in part on an association between the destination information and the one or more products. A vendor server may be associated with a particular vendor of a product (e.g., a shop or store located at a destination). As an example, a vendor server and an associated vendor API may be for a duty-free shop, a clothing store, an electronics store, a flower shop, or any other retailer associated with a physical location at a destination. In another example, the vendor API may be a local API executed on an onboard server. The local API may be configured to determine whether the vendor servers are accessible via a satellite network, and in the case that the vendor servers are not accessible, the vendor API retrieves cached product details. However, if the remote vendor APIs are available then the local API may call the functionality of the remote vendor APIs. As will be appreciated, the vendor API can comprise combinations of the API aspects described above.

The vendor server, in response to receiving a request for product details included in product listings, uses the destination information to identify a product listing stored on the vendor server that is associated with the destination information. For example, the vendor server may retrieve the product details from a product catalog using listing metadata that links the product details to the destination information. The vendor server may send the product details via the vendor API to the server located onboard the aircraft.

As in block 630, the server onboard the aircraft may receive the product details for the product to display in the inflight entertainment system. In one example, the onboard server may associate the product details with a categorized grouping of products. For example, the onboard server may organize products identified in the product details into categorized groupings of products using listing metadata received from the vendor servers. Products may span a variety of categories, such as electronics, clothing, jewelry, health and beauty products, souvenirs etc., where each category may include sub-categories. The onboard server can evaluate listing metadata for a product and assign the product to a corresponding categorized grouping of products. In another example, the onboard server may receive a plurality of product details for products which have been pre-grouped into categorized groupings (e.g., products pre-grouped into electronics, clothing, jewelry, souvenirs, etc.).

As in block 640, the onboard server may send the product details to a client device to be displayed in a graphical user interface of the inflight entertainment system. The graphical user interface of the IFE may be displayed at the client device and may enable the passenger on the aircraft to interact with a product listing or page containing the product details (e.g., view details for the product and purchase the product). In one example, a connection between the onboard server and the client device may be a wireless connection established via a wireless access point onboard the aircraft. In another example, the client device may be a seatback system on the aircraft, and the connection between the onboard server and the seatback system may be a wired or wireless connection.

In one example, the onboard server may be configured to determine a time to display product details in the IFE. As one example, the onboard server may evaluate aircraft flight information obtained from the aircraft data bus to determine a current status of a flight (e.g., parked at gate, takeoff, in-flight, time to arrival, rerouted to another destination, or landing), and the onboard server may determine whether to obtain product details for a product and display the product details in the IFE based in part on the current status of the flight. As a specific example, the onboard server may obtain destination-specific product details from vendor servers at the time when the aircraft is rerouted to a new destination due to weather conditions in order to provide passengers with products that are available at the new destination. In another example, the onboard server may obtain a passenger profile for a passenger associated with a client device at the time that the aircraft is at a gate and use passenger information to select products available at the gate to display to the passenger in the IFE, thereby customizing or targeting the products shown to the passenger.

The passenger may purchase the product displayed in the IFE. In one example, the onboard server may receive a message from a client device associated with the passenger that includes a transaction request to purchase the product. The message may include passenger information and payment information for purchasing of the product. In response to receiving the message, the onboard server may forward the message to the vendor API associated with a vendor of the product. The message sent to the vendor API may include the transaction request, the passenger information, and the payment information to allow the vendor to complete the purchase of the product and deliver the product at the flight destination.

Figure 7:
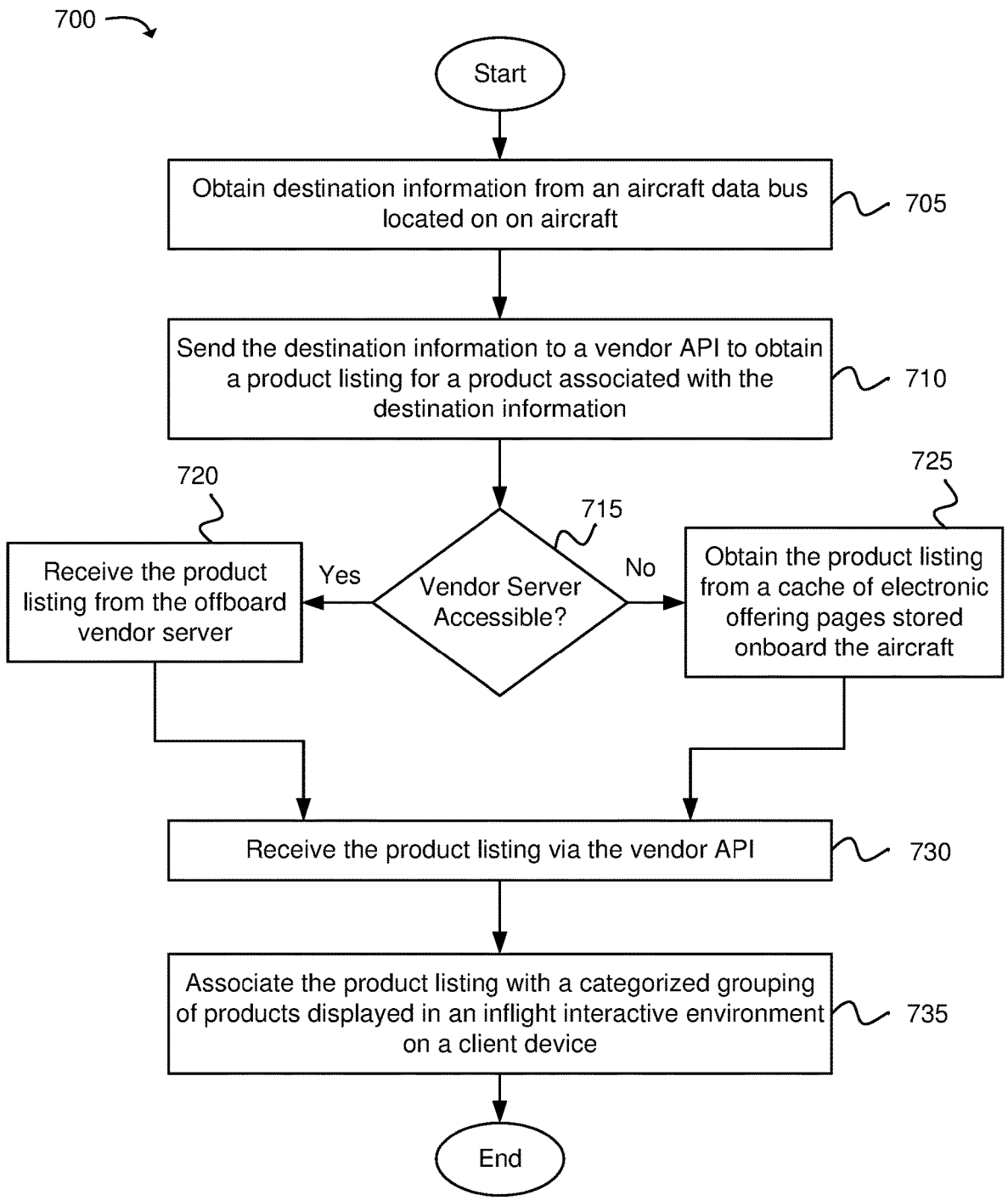
FIG. 7 is a flow diagram illustrating another example method for providing cached product listings to passengers on an aircraft when a vendor server is not available.

FIG. 7 is a flow diagram that illustrates an example method 700 for providing cached product listings to passengers on an aircraft when a vendor server is not available. As in block 705, a server located onboard an aircraft may obtain destination information from an aircraft bus, as described previously. As in block 710, the onboard server may send the destination information to a vendor API with a request for product listings associated with the destination information. In this example, the vendor API may be a local API executed on the onboard server. The vendor API may be configured to obtain product listings from a plurality of vendor servers located off-board the aircraft, or from a cache of product listings stored onboard the aircraft when a vendor server is unavailable to fulfill requests.

As in block 715, the vendor API may be configured to determine whether one or more vendor servers are accessible via a satellite network. For example, the vendor API may send a request for a product listing to a vendor server over the satellite network, and if a response is not received from the vendor server within a request timeout period (e.g., 30 seconds, 120 seconds, etc.), the vendor API may determine that the vendor server is unavailable to accept the request. As illustrated in block 725, in the case that a vendor server does not respond to a request for a product listing, the vendor API may obtain a product listing from a cache of product listings stored locally onboard the aircraft. As in block 720, in the case that the vendor server does respond to the request for the product listing within the request timeout period, the vendor API may obtain the product listing from the vendor server through the satellite network.

As in block 730, the vendor API may provide the product listing to an offering subsystem of an inflight interactive system executed on the onboard server. As in block 735, the offering subsystem may associate the product listing with a categorized grouping of products displayed in an IFE on a client device. For example, the offering subsystem may assign the product listing to a categorized grouping of products using listing metadata obtained from a vendor server, and provide the product listing to the IFE. In another example, pre-grouped product listings can be provided to the offering subsystem of the inflight interactive system.

Figure 8:
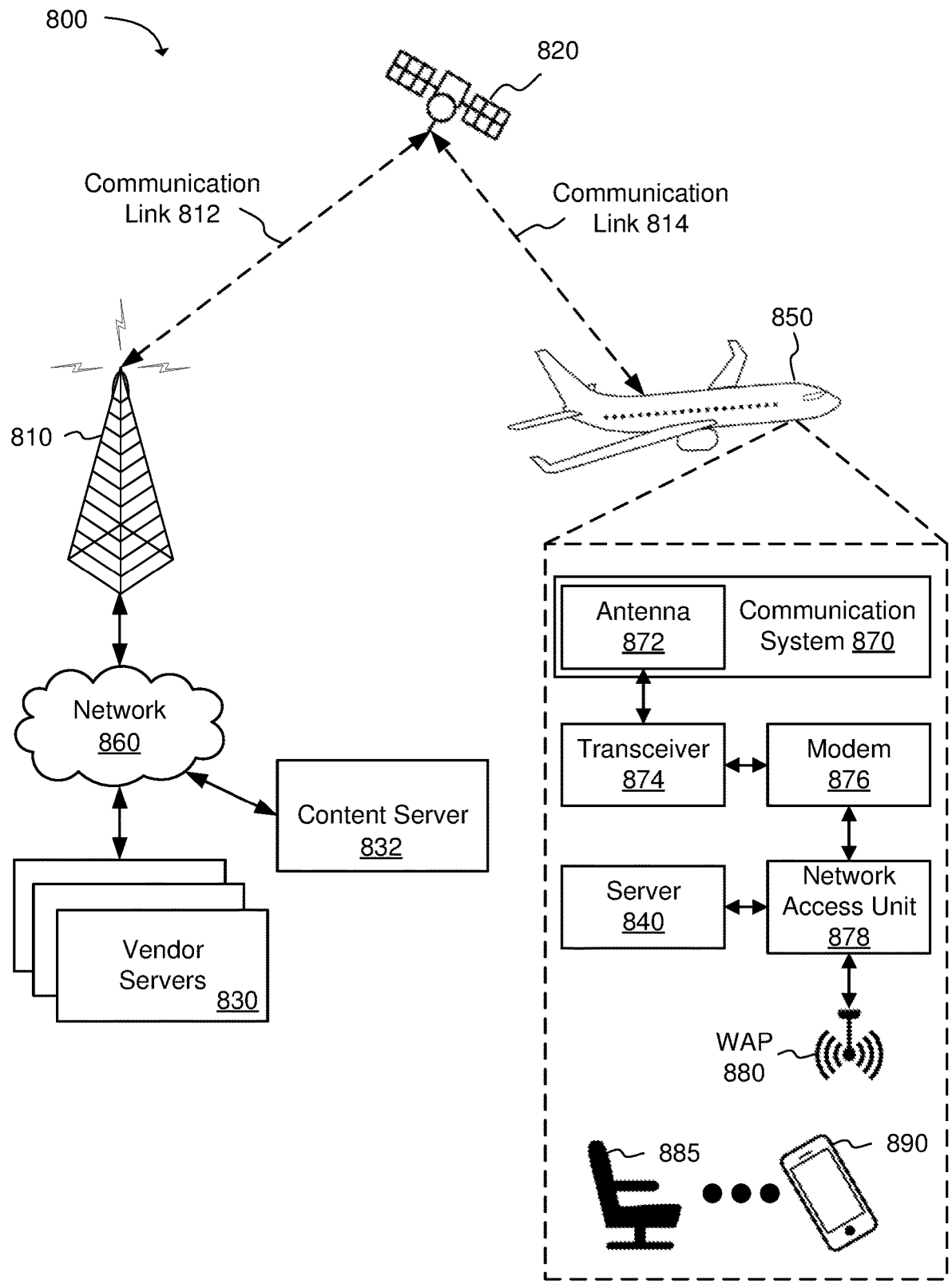
FIG. 8 is a block diagram illustrating a satellite communication system according to an example of the present technology.

FIG. 8 illustrates an example of a satellite communication system 800. The satellite communication system 800 may include satellite(s) 820 in bidirectional communication with a ground station 810 via a communication link 812 between the satellite 820 and the ground station 810. The satellite 820 may also be in bidirectional communication with an aircraft 850 (e.g., an airplane, helicopter, blimp, or balloon) via a communication link 814 between the satellite 820 and the aircraft 850. The communication link 812 and the communication link 814 may enable communication between the aircraft 850 and the ground station 810 via the satellite 820 while the aircraft 850 is stationary or in motion.

In one example, the satellite communication system 800 may include multiple satellites 820, where each satellite 820 may provide coverage for a service area, and service areas for different satellites may be non-overlapping or overlapping. The satellite communication system 800 may be any suitable type of satellite system, including a geostationary satellite system, medium earth orbit satellite system, low earth orbit satellite system, or combinations thereof. The satellite 820 may have a number of beams directed at different regions on Earth, where the coverage area of each beam may be non-overlapping or overlapping with one or more other beams. The satellite 820 may have one or more spot beams covering different regions on Earth within the service area of the satellite 820. As another example, the satellite 820 may have one or more wide area coverage beams covering the service area of the satellite 820. As yet another example, the satellite 820 may have a combination of spot beams and wide area coverage beams.

In one configuration, the aircraft 850 may include a communication system 870 to facilitate bidirectional communication with the satellite 820 via the communication link 814. The communication system 870 may include an antenna 872 to receive a downlink signal from the satellite 820 and transmit an uplink signal to the satellite 820 via the communication link 814. The aircraft 850 may include a transceiver 874 in communication with the antenna 872, a modem 876 in communication with the transceiver 874, a network access unit 878 (e.g., a router) in communication with the modem 876, and a wireless access point (WAP) 880 in communication with the network access unit 878. Further, the wireless access point 880 may communicate with one or more client devices in the aircraft 850, such as seatback systems 885 and/or client devices 890 (e.g., mobile phones, tablets, laptops) in the aircraft 850. Therefore, the communication system 870 may receive a downlink signal from the satellite 820 and forward the downlink signal to the client devices, and receive an uplink signal from the client devices and forward the uplink signal to the satellite 820, thereby supporting two-way data communications between the client devices within the aircraft 850 and the satellite 820.

In one configuration, the network access unit 878 may be in communication with a server 840 (such as the server 110 described earlier) onboard the aircraft 850. The server 840 may provide an IFE to enable a passenger on the aircraft 850 to access a categorized grouping of product listings through the IFE. The server 840 may send the IFE to the client device 890 onboard the aircraft 850 over a connection for display via the user interface of the client device 890. The server 840 may receive a selection of a product listing included in a categorized grouping via a user interface of the IFE. The server 840 may send the product listing to the client device 890 for display on the client device 890.

In one example, the seatback system 885 may be a fixed or on-aircraft device. The seatback system 885 may communicate with the server 840 via a wired communication link. For example, the seatback system 885 may communicate with the network access unit 878 over a wired communication link, and the network access unit 878 may communicate with the server 840 over a wired communication link. Alternatively, the seatback system 885 may communicate with the server 840 via the network access unit 878 and the wireless access point 880. The seatback system 885 may execute one or more applications that provide an interface for passenger on the aircraft 850 to obtain and consume data.

In one example, the client device 890 may receive and display data, and may be brought onto the aircraft 850 by passengers (which includes crew members). The client devices 890 may execute one or more applications that provide the interface for passenger to obtain and consume data. The passenger may have the option to select/request data for viewing from the interface. When a passenger interacts with the client device 890, the client device 890 may transmit a request for data to the network access unit 878 via the wireless access point 880. The client device 890 may receive requested data from the network access unit 878 via the wireless access point 880. Thus, the wireless access point 880 may provide communication between the network access unit 878 and personal electronic device 890.

In one example, the network access unit 878 may receive requests for data from the client device 890 via the wireless access point 880 and multiplex and forward the requests to the modem 876. The network access unit 878 may receive and demultiplex packets associated with the data, and forward the data to the client device 890 via the wireless access point 880.

In one example, the modem 876 may receive requests for data from the network access unit 878, and the modem 876 may generate modulated data (e.g., transmit intermediate frequency (IF) signal) for delivery to the transceiver 874. Further, the modem 876 may receive requested data as a modulated data (e.g., receive intermediate frequency (IF) signal) from the transceiver 874 and demodulate that data for transmission to the network access unit 878. In one example, the modem 876 may be integrated with the network access unit 878, or alternatively, the modem 876 and the network access unit 878 may be separate components.

In one example, the transceiver 874 may up-convert and amplify modulated data received from the modem 876 to generate an uplink signal for transmission to the satellite 820 via the antenna 872. Similarly, the transceiver 874 may receive a downlink signal from the satellite 820 via the antenna 872. The transceiver 874 may then amplify and down-convert the downlink signal to generate modulated downlink data (e.g., receive IF signal) for demodulation by the modem 876.

In one example, the ground station 810 may also be referred to as an access node, a hub or a gateway. The ground station 810 may include an antenna to transmit an uplink signal to the satellite 820 and receive a downlink signal from the satellite 820. The ground station 810 may be in communication with a vendor server 830 via a network 860. The vendor server 830 may manage a plurality of product listings, as described earlier.

In one example, the network 860 may be any type of network and may include for example, an internet, an internet protocol (IP) network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, a cellular network, and/or any other type of network supporting communication as described herein. The network 860 may include both wired and wireless connections as well as optical links.

In one example, the ground station 810 may be provided as an interface between the network 860 and the satellite 820. The ground station 810 may receive data and information directed to the seatback system 885 and/or the client device 890 onboard the aircraft 850 from a content server 832 and vendor servers 830 accessible via the network 860. The ground station 810 may format the data and information and transmit an uplink signal to the satellite 820 for subsequent delivery to the aircraft 850 (and then the seatback system 885 and/or the client device 890). Similarly, the ground station 810 may receive a downlink signal from the satellite 820 (e.g., containing requests, data and/or information originating from the seatback system 885 and/or the client device 890 on the aircraft 850) that is directed to a destination accessible via the network 860. The ground station 810 may format the received downlink signal for transmission on the network 860.

In one configuration, the seatback system 885 and/or the client device 890 may be onboard the aircraft 850. Alternatively, the seatback system 885 and/or the client device 890 may be onboard other types of vehicles, such as trains, automobiles (e.g., cars, trucks, busses, etc.), watercraft (e.g., private boats, commercial shipping vessels, cruise ships, etc.) and others.

Figure 9:
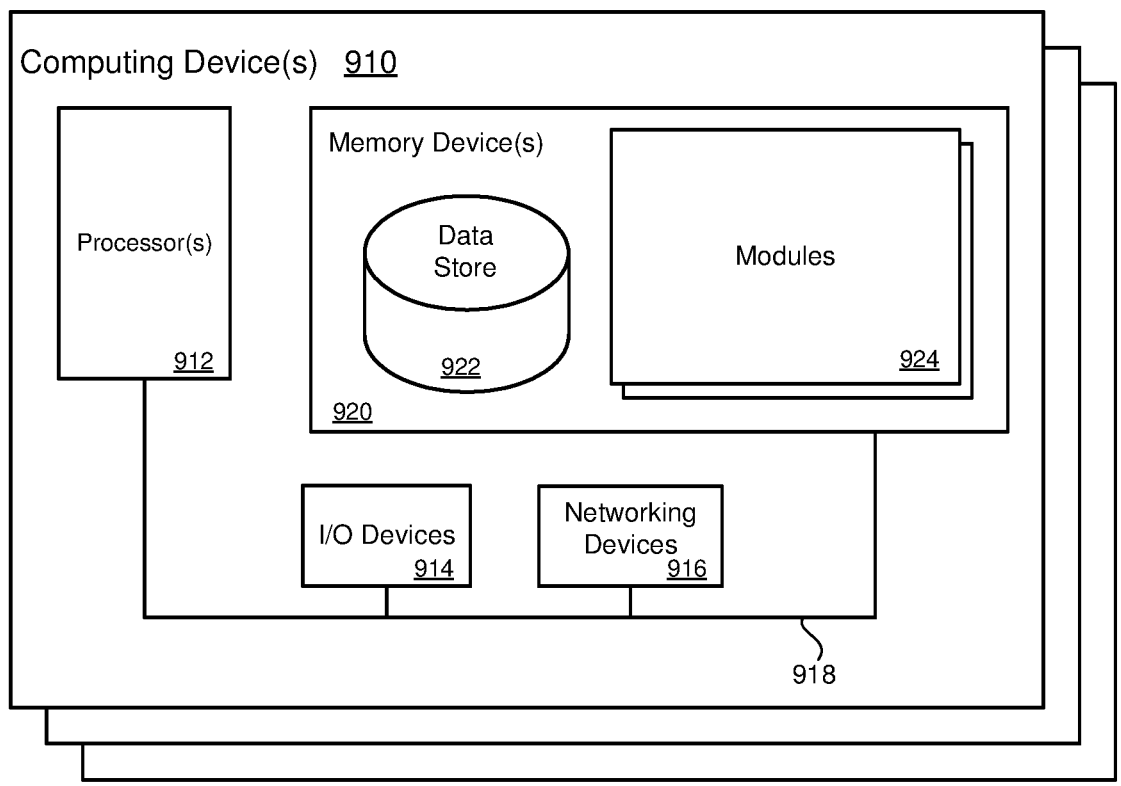
FIG. 9 is a block diagram illustrating an example of a computing device that may be employed in the present technology.

FIG. 9 illustrates a computing device 910 which may execute the foregoing subsystems of this technology. The computing device 910 and the components of the computing device 910 described herein may correspond to the servers and/or client devices described above. The computing device 910 is illustrated on which a high-level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules 924 that are executable by the processor(s) 912 and data for the modules 924. For example, the memory device 920 may include an inflight interactive system module, an offerings subsystem module, a passenger profile subsystem module, an onboard fulfillment subsystem module, and other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher-level language may be compiled into machine code in a format that may be loaded into a random-access portion of the memory device 920 and executed by the processor 912, or source code may be loaded by another executable program and interpreted to generate instructions in a random-access portion of the memory to be executed by a processor. The executable program may be stored in any portion or component of the memory device 920. For example, the memory device 920 may be random access memory (RAM), read only memory (ROM), flash memory, a solid-state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom Very Large Scale Integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

In describing the present technology, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide.

Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system for providing electronic product listings for products available at a destination, comprising:
    at least one processor; and
    a memory device including instructions that, when executed by the at least one processor, cause the system to:
    obtain destination information from an aircraft data bus of an aircraft, wherein the destination information is from a plurality of aircraft information systems located on the aircraft;
    send the destination information to at least one vendor application programming interface (API) to obtain product details for at least one product that is available for purchase through an inflight entertainment system and is available to be delivered at a flight destination, wherein the vendor API is configured to communicate, via a communications network, with a vendor server associated with a product vendor, the vendor server located off the aircraft;
    obtain, using the vendor API, the product details from a cache of product listings stored on the aircraft when the communications network used to communicate with the vendor server is unavailable, the cache of product listings including metadata for the product listings used to identify an association between the destination information and the product listings included in the cache of product listings;
    receive the product details to display in the inflight entertainment system; and
    send the product details to a client device to be displayed in a graphical user interface of the inflight entertainment system, wherein the graphical user interface of the inflight entertainment system to allow a passenger on the aircraft to view the product details with a plurality of product details for a plurality of products and purchase the at least one product through the inflight entertainment system.

2. The system of claim 1, wherein the memory device further includes instructions that, when executed by the at least one processor, cause the system to:
    associate the product details with a categorized grouping of products displayed in the graphical user interface of the inflight entertainment system.

3. The system of claim 1, wherein the memory device further includes instructions that, when executed by the at least one processor, cause the system to:
    receive a message from the client device including a transaction request to purchase the at least one product, wherein the message includes passenger information and payment information for purchasing of the at least one product; and
    send the message to the vendor API with the transaction request, wherein the message includes the passenger information and the payment information to allow a vendor to complete the purchase of the at least one product and deliver the at least one product at the flight destination.

4. The system of claim 3, wherein the memory device further includes instructions that, when executed by the at least one processor, cause the system to:
   obtain a customer profile for a passenger associated with the client device; and
   send customer information in the customer profile to the vendor API to allow the passenger information to be used to select targeted product listings presented to the passenger.

5. The system of any one of claim 1, wherein the at least one product in the product details is further available for inflight delivery or customer-home delivery.

6. The system of claim 1, wherein the vendor server determines whether one or more products in a product catalog are available for delivery at a flight destination based in part on an association between the destination information and the one or more products.

7. The system of claim 6, wherein the vendor server determines whether the one or more products in the product catalog are available for inflight delivery based in part on a product inventory onboard the aircraft.

8. The system of claim 6, wherein the communications network includes a satellite network.

9. The system of claim 6, wherein the client device is a seatback system on the aircraft, and a connection between the vendor server and the seatback system is a wired or wireless connection.

10. The system of claim 1, wherein the memory device further includes instructions that, when executed by the at least one processor, cause the system to periodically update the cache of product listings stored on the aircraft when the satellite network is available to communicate with the vendor server, wherein the vendor server uses the destination information to identify the product listings to include in the cache of product listings.

11. The system of claim 1, wherein the memory device further includes instructions that, when executed by the at least one processor, cause the system to:
   evaluate the destination information to determine a current status of a flight; and
   determine whether to obtain the product details to be displayed in the graphical user interface of the inflight entertainment system based in part on the current status of the flight.

12. The system of claim 1, wherein obtaining the destination information from the aircraft data bus further comprises obtaining aircraft flight information to send to the vendor API and obtain the product details for the at least one product, wherein the aircraft flight information includes at least one of: an aircraft origin, an aircraft destination, a passenger destination, an estimated arrival time, an arrival gate, a current latitude and longitude of the aircraft, a current aircraft speed, a current aircraft altitude, an aircraft type, an origin weather report, or a seatbelt warning status.

13. The system of claim 1, wherein the client device is a personal electronic device.

14. A method, comprising:
   obtaining destination information from an aircraft data bus, wherein the destination information is from a plurality of aircraft information systems located on an aircraft;
   sending the destination information to at least one vendor application programming interface (API) to obtain product details for at least one product that is available for purchase through an inflight entertainment system and is available to be delivered at a flight destination, wherein the vendor API is configured to communicate, via a communications network, with a vendor server associated with a product vendor, the vendor server located off the aircraft;
   obtaining, using the vendor API, the product details from a cache of product listings stored on the aircraft when the communications network used to communicate with the vendor server is unavailable, the cache of product listings including metadata for the product listings used to identify an association between the destination information and the product listings included in the cache of product listings;
   receiving the product details to display in the inflight entertainment system; and
   sending the product details to a client device to be displayed in a graphical user interface of the inflight entertainment system, wherein the graphical user interface of the inflight entertainment system allows a passenger on the aircraft to view the product details with a plurality of product details for a plurality of products and purchase the at least one product through the inflight entertainment system.

15. The method of claim 14, further comprising associating the product details with a categorized grouping of products displayed in the graphical user interface of the inflight entertainment system.

16. The method of claim 14, further comprising:
   receiving a message from the client device including a transaction request to purchase the at least one product, wherein the message includes passenger information and payment information for purchasing of the at least one product; and
   sending the message to the vendor API with the transaction request, wherein the message includes the passenger information and the payment information to allow a vendor to complete the purchase of the at least one product and deliver the at least one product at the flight destination.

17. The method of claim 16, further comprising:
   obtaining a customer profile for a passenger associated with the client device; and
   sending customer information in the customer profile to the vendor API to allow the passenger information to be used to select targeted product listings presented to the passenger.

18. The method of claim 14, wherein the at least one product in the product details is further available for inflight delivery or customer-home delivery.

19. The method of claim 14, wherein, and the vendor server determines whether one or more products in a product catalog are available for delivery at a flight destination based in part on an association between the destination information and the one or more products.

20. The method of claim 19, wherein the vendor server determines whether the one or more products in the product catalog are available for inflight delivery based in part on a product inventory onboard the aircraft.

21. The method of claim 19, wherein the communications network includes a satellite network.

22. The method of claim 19, wherein the client device is a seatback system on the aircraft, and a connection between the vendor server and the seatback system is a wired or wireless connection.

23. The method of claim 14, further comprising periodically updating the cache of product listings stored on the aircraft when the satellite network is available to communicate with the vendor server, wherein the vendor server uses the destination information to identify the product listings to include in the cache of product listings.

24. The method of claim 14, further comprising:
evaluating the destination information to determine a current status of a flight; and
determining whether to obtain the product details to be displayed in the graphical user interface of the inflight entertainment system based in part on the current status of the flight.

25. The method of claim 14, wherein obtaining the destination information from the aircraft data bus further comprises obtaining aircraft flight information from the aircraft data bus to send to the vendor API and obtain the product details for the at least one product, wherein the aircraft flight information includes at least one of: an aircraft origin, an aircraft destination, a passenger destination, an estimated arrival time, an arrival gate, a current latitude and longitude of the aircraft, a current aircraft speed, a current aircraft altitude, an aircraft type, an origin weather report, or a seatbelt warning status.

26. The method of claim 14, wherein the client device is a personal electronic device.

27. A non-transitory machine readable storage medium including instructions embodied thereon, wherein the instructions, when executed by at least one processor, cause the processor to:
obtain destination information from an aircraft data bus, wherein the destination information is from a plurality of aircraft information systems located on an aircraft;
send the destination information to at least one vendor application programming interface (API) to obtain product details for at least one product that is available for purchase through an inflight entertainment system and is available to be delivered at a flight destination, wherein the vendor API is configured to communicate, via a communications network, with a vendor server associated with a product vendor, the vendor server located off the aircraft;
obtain, using the vendor API, the product details from a cache of product listings stored on the aircraft when the communications network used to communicate with the vendor server is unavailable, wherein the cache of product listings includes metadata used to identify an association between the destination information and the product details included in the cache of product listings;
receive the product details to display in the inflight entertainment system; and
send the product details to a client device to be displayed in a graphical user interface of the inflight entertainment system, wherein the graphical user interface of the inflight entertainment system allows a passenger on the aircraft to view the product details with a plurality of product details for a plurality of products and purchase the at least one product through the inflight entertainment system.

28. The non-transitory machine readable storage medium of claim 27, further comprising associating the product details with a categorized grouping of products displayed in the graphical user interface of the inflight entertainment system.

29. The non-transitory machine readable storage medium of claim 27, further comprising instructions, that when executed by the at least one processor:
receive a message from the client device including a transaction request to purchase the at least one product, wherein the message includes passenger information and payment information for purchasing of the at least one product; and
send the message to the vendor API with the transaction request, wherein the message includes the passenger information and the payment information to allow a vendor to complete the purchase of the at least one product and deliver the at least one product at the flight destination.

30. The non-transitory machine readable storage medium of claim 29, further comprising instructions, that when executed by the at least one processor:
obtain a customer profile for a passenger associated with the client device; and
send customer information in the customer profile to the vendor API to allow the passenger information to be used to select targeted product listings presented to the passenger.

31. The non-transitory machine readable storage medium of claim 27, wherein the at least one product in the product details is further available for inflight delivery or customer-home delivery.

32. The non-transitory machine readable storage medium of claim 29, and the vendor server determines whether one or more products in a product catalog are available for delivery at a flight destination based in part on an association between the destination information and the one or more products.

33. The non-transitory machine readable storage medium of claim 32, wherein the vendor server determines whether the one or more products in the product catalog are available for inflight delivery based in part on a product inventory onboard the aircraft.

34. The non-transitory machine readable storage medium of claim 32, wherein the communications network includes a satellite network.

35. The non-transitory machine readable storage medium of claim 34, wherein the client device is a seatback system on the aircraft, and a connection between the vendor server and the seatback system is a wired or wireless connection.

36. The non-transitory machine readable storage medium of claim 27, further comprising instructions, that when executed by the at least one processor, periodically update the cache of product listings stored on the aircraft when the satellite network is available to communicate with the vendor server, wherein the vendor server uses the destination information to identify the product listings to include in the cache of product listings.

37. The non-transitory machine readable storage medium of claim 27, further comprising instructions, that when executed by the at least one processor:
evaluate the destination information to determine a current status of a flight; and
determine whether to obtain the product details to be displayed in the graphical user interface of the inflight entertainment system based in part on the current status of the flight.

38. The non-transitory machine readable storage medium of claim 27, wherein obtaining the destination information from the aircraft data bus further comprises obtaining aircraft flight information from the aircraft data bus to send to the vendor API and obtain the product details for the product, wherein the aircraft flight information includes at least one of: an aircraft origin, an aircraft destination, a passenger destination, an estimated arrival time, an arrival gate, a current latitude and longitude of the aircraft, a current aircraft speed, a current aircraft altitude, an aircraft type, an origin weather report, or a seatbelt warning status.

39. The non-transitory machine readable storage medium of claim 27, wherein the client device is a personal electronic device.

* * * * *